Nov. 6, 1928.
J. MORGAN
ADJUSTABLE PLOW
Filed Sept. 7, 1927
1,690,238
2 Sheets-Sheet 1
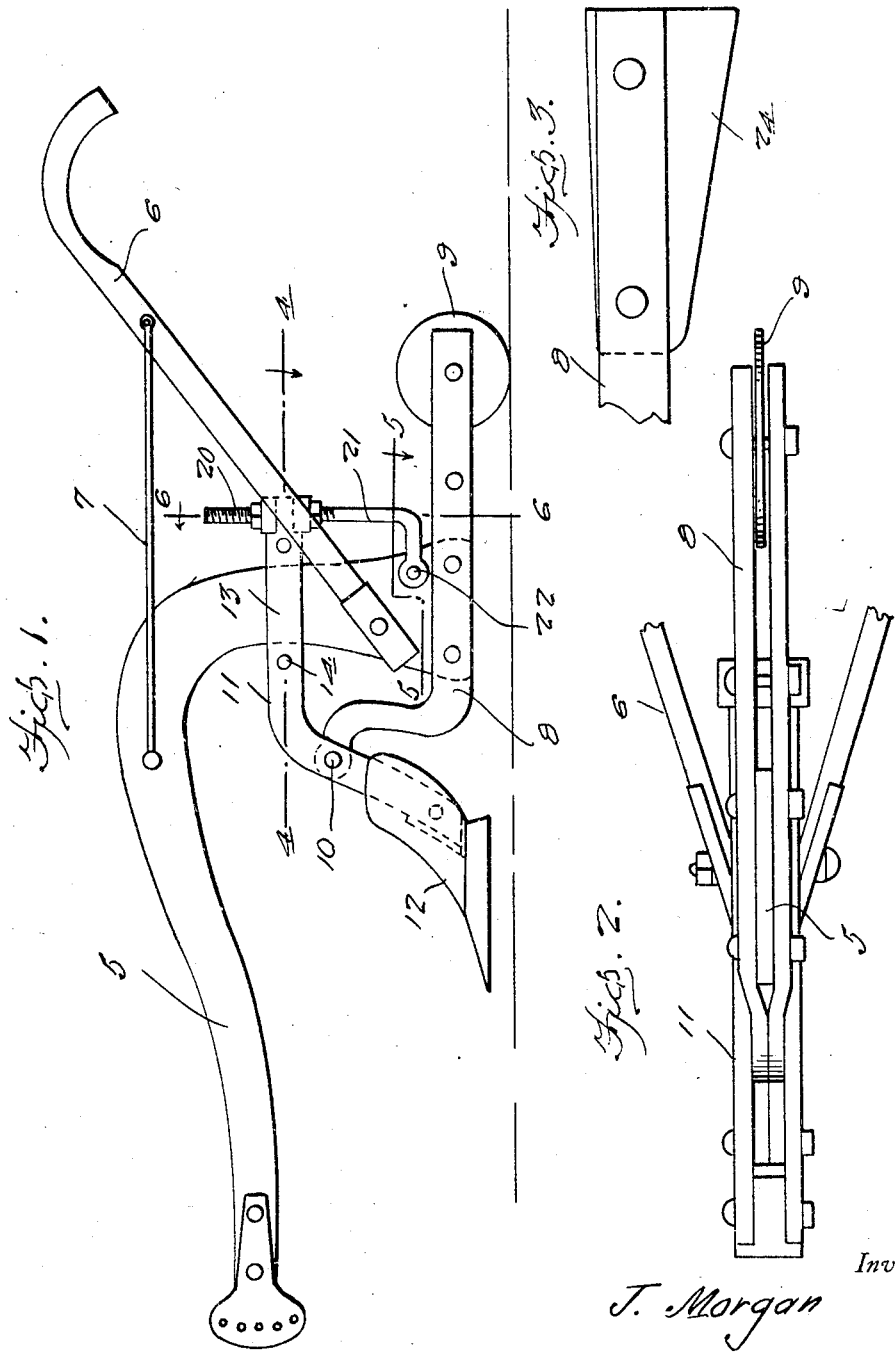
Inventor
J. Morgan
By Clarence A. O'Brien
Attorney Nov. 6, 1928.

J. MORGAN 1,690,238

ADJUSTABLE PLOW

Filed Sept. 7, 1927

Inventor
J. Morgan

By Clarence A. O'Brien
Attorney

Patented Nov. 6, 1928.

1,690,238

UNITED STATES PATENT OFFICE.

JOSEPH MORGAN, OF FRANKLIN, TEXAS.

ADJUSTABLE PLOW.

Application filed September 7, 1927. Serial No. 218,079.

This invention relates to plows and has for its principal object to provide means for mounting the plow sweep whereby to enable the same to be adjusted at an inclined angle with respect to the horizontal plane of the plow thereby enabling the depth of the furrow being cut to be regulated.

A further object of the invention is to provide an apparatus of this character of simple and practical construction, strong and durable, embodying means permitting the adjustment of the sweep to be made easily and quickly, inexpensive to manufacture, and otherwise well adapted for the purposes for which the same is intended.

Other objects and advantages reside in the special construction and combination of the various elements constituting the invention, reference being had to the accompanying drawings forming a part hereof, wherein:—

Figure 1 is a view in side elevation.

Figure 2 is a fragmentary bottom plan view.

Figure 3 is a modified form of drag.

Figure 4:
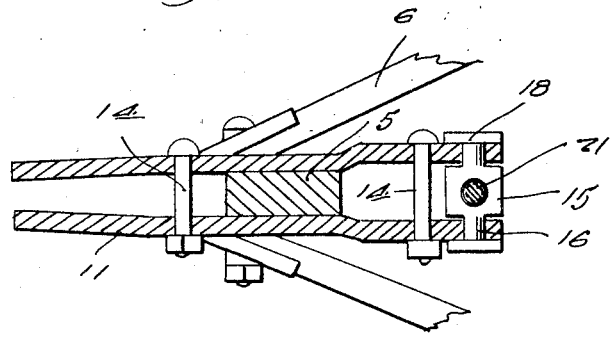
Figure 4 is a horizontal sectional view taken along a line 4—4 of Figure 1.
Figure 5:
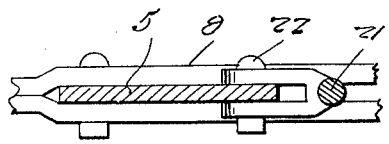
Figure 5 is a similar view taken along a line 5—5 of Figure 1.
Figure 6:
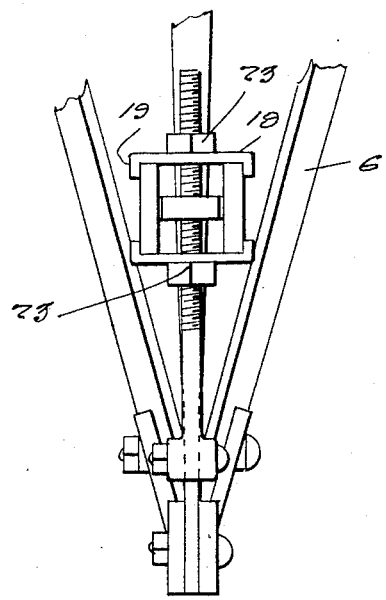
Figure 6 is a vertical sectional view through the plow sweep adjusting screw taken along a line 6—6 of Figure 1.

Referring now to the drawings in detail, my invention comprises a plow including a beam 5 having handle members 6 attached at one end thereto and supported by braces 7 extending between the beam and the handle. At the lower end of the beam is attached a bifurcated slide 8 with a rolling cutter 9 mounted at its rear end with its forward end extending upwardly in an S-shaped formation and provided with a pivot pin 10 upon which the standard 11 is pivotally mounted intermediate its ends. The forward end of the standard extends downwardly at an inclined angle and has the plow sweep 12 fixedly secured thereto. The upper end of the standard indicated at 13 is bifurcated and extends rearwardly at a horizontal plane with the sections of the bifurcations arranged at opposite sides of the beam. Bolts 14 extend transversely of the bifurcated sections of the standard connecting the same in spaced parallel relation and enabling the same to be moved vertically with respect to the beam.

A nut 15 is interposed between the ends of the bifurcated sections 13 having studs 16 formed at opposite sides thereof adapted to be inserted in openings arranged within the sections 13 for supporting the nuts therebetween. Plates 18 are arranged along the upper and lower edges of the bifurcated sections having flanges 19 formed at the ends thereof overlapping the sides of the sections 13 and provided with openings arranged in vertical alinement with the threaded opening of the nut 15.

An angular adjusting arm 21 is pivotally secured at 22 to the beam 5 and extending in a vertical direction and having its upper end threaded as at 20 for inserting through the openings in the plates 18 and nut 15, with nuts 23 threaded thereon above and beneath the plates whereby to secure the rear end of the bifurcated sections of the standards 13 in adjusted vertical position.

It will be apparent from the foregoing explanation that by reason of the vertical adjustment of the rear end of the standards, that the forward end thereof upon which the sweep 12 is mounted, may be raised or lowered, thereby regulating the depth of the furrow cut by the plow.

If desired, a drag 24 or knife cutter may be mounted on the rear end of the slide 8 in lieu of the rolling cutter 9.

It is obvious that the invention is susceptible to various changes and modifications of the various elements without departing from the spirit or scope of the appended claims or sacrificing any of its advantages, and I accordingly claim all such forms of the device to which I am entitled.

I claim:—

1. In combination, a plow beam, handle members carried thereby, a slide attached to the lower end of the beam, said slide having its forward ends extending upwardly in an S-shaped formation, a standard pivotally mounted on the upper end of said slide, said standard having one end extending forwardly and downwardly and adapted to support a plow sweep thereon, the opposite end of said standard extending rearwardly in bifurcated formation with the sections thereof disposed at opposite sides of the beam, a vertically disposed adjusting rod having a threaded upper end and its lower end angularly formed for attaching to the beam, and means for adjustably securing the threaded end of said rod to the rear end of said standard whereby to enable the vertical adjustment thereof.

2. In combination, a plow beam, handle members attached thereto, a slide secured to the lower end of the beam having a cutter mounted at the rear end thereof and its forward end extending upwardly in an S-shaped formation, a standard pivotally mounted on the upper ends of said slide, said standard having its forward end extending downwardly and forwardly and adapted to have a plow sweep attached thereto and having its opposite ends bifurcated and extending rearwardly at a horizontal plane with the bifurcated sections thereof disposed at opposite sides of the beam, a nut having studs extending at opposite sides thereof supported between the rear ends of the bifurcated sections of the standards, plates arranged at the upper and lower edges of said sections, having openings in alinement with the opening of the nut, said plates having flanges at each end overlapping the side of the standard and an angular adjusting rod vertically disposed with its lower end secured to the beam and its upper end threadedly inserted through the opening in the nut and the plate and retaining nuts carried on the threaded end of the rod at the opposite sides of the plate whereby to secure the same in adjusted position with respect to the standard.

3. In combination, a plow beam, handle members carried thereby, a slide attached to the plow beam, said slide having its forward end extending upwardly, a standard pivotally mounted on the upper end of said slide, said standard having one end extending forwardly and downwardly and adapted to support a plow sweep thereon, the opposite end of said standard extending rearwardly beyond the beam, a vertically disposed adjusting rod attached to the beam and means for adjustably securing said rod to the rear end of said standard whereby to enable the vertical adjustment thereof.

In testimony whereof I affix my signature.

JOSEPH MORGAN.